(12) United States Patent
Smith et al.

(10) Patent No.: US 8,892,833 B2
(45) Date of Patent: Nov. 18, 2014

(54) SYSTEMS, METHODS, AND COMPUTER PROGRAM PRODUCTS PROVIDING SNAPSHOT DATA REPLICATION IN A DISTRIBUTED ANALYTIC COMPUTING SYSTEM

(75) Inventors: Hubbert Smith, Sandy, UT (US);
Joseph Moore, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 157 days.

(21) Appl. No.: 13/354,903

(22) Filed: Jan. 20, 2012

(65) Prior Publication Data
US 2013/0191589 A1      Jul. 25, 2013

(51) Int. Cl.
| | |
|---|---|
| G06F 12/16 | (2006.01) |
| G06F 11/273 | (2006.01) |
| G06F 11/00 | (2006.01) |
| G06F 11/20 | (2006.01) |

(52) U.S. Cl.
CPC ............ *G06F 12/16* (2013.01); *G06F 2201/84* (2013.01); *G06F 11/2733* (2013.01); *G06F 11/00* (2013.01); *G06F 11/2094* (2013.01)
USPC .......................................... 711/162; 707/634

(58) Field of Classification Search
CPC . G06F 11/1451; G06F 11/2094; G06F 3/065; G06F 3/0689; G06F 9/00; G06F 11/00; G06F 11/1461; G06F 11/2733; G06F 12/16; G06F 2201/815

USPC ........................................... 711/162; 707/634
See application file for complete search history.

(56) References Cited

U.S. PATENT DOCUMENTS

| | | | |
|---|---|---|---|
| 7,953,899 B1 * | 5/2011 | Hooper .............................. | 710/5 |
| 2006/0212481 A1 * | 9/2006 | Stacey et al. ................ | 707/104.1 |
| 2009/0260007 A1 * | 10/2009 | Beaty et al. ....................... | 718/1 |
| 2011/0113206 A1 * | 5/2011 | Heim .............................. | 711/162 |
| 2011/0126083 A1 * | 5/2011 | Kawaguchi .................... | 714/770 |
| 2011/0313973 A1 * | 12/2011 | Srivas et al. ................... | 707/634 |
| 2012/0066285 A1 * | 3/2012 | McGowan et al. ............ | 709/201 |
| 2012/0151136 A1 * | 6/2012 | Hay et al. ....................... | 711/114 |
| 2012/0311227 A1 * | 12/2012 | Anzai et al. .................... | 711/102 |

OTHER PUBLICATIONS

"HDFS User's Guide", The Apache Software Foundation, © 2008, Last published Oct. 7, 2011, pp. 1-10.

* cited by examiner

*Primary Examiner* — Hashem Farrokh
(74) *Attorney, Agent, or Firm* — Haynes and Boone, LLP

(57) ABSTRACT

A computer program product having a computer readable medium tangibly recording computer program logic for performing analytics on data at a data node, the computer program product including code to instruct a storage array to create a snapshot of the data, code to access the snapshot, by the data node, as an independent virtual volume, code to receive, at the data node, a command mapping a processing task to the data node, in which the processing task includes analysis on the data, and code to perform the processing task on the data by accessing the data through the snapshot.

20 Claims, 3 Drawing Sheets

SYSTEMS, METHODS, AND COMPUTER PROGRAM PRODUCTS PROVIDING SNAPSHOT DATA REPLICATION IN A DISTRIBUTED ANALYTIC COMPUTING SYSTEM

TECHNICAL FIELD

The present description relates to distributed analytic computing systems and, more specifically, to using snapshot replication in such computing systems.

BACKGROUND

Various systems exist to perform analysis on very large data sets (e.g., petabytes of data). One such example is a Map Reduce distributed computing system for large analytic jobs. In such a system, a master node manages the storage of data blocks in one or more data nodes. The master node and data nodes are server computers with local storage. When the master node receives a processing task, the master node partitions that task into smaller jobs, where the jobs are assigned to the different subordinate (data) nodes. This is the mapping part of Map Reduce, where the master node maps processing jobs to the subordinate nodes.

The subordinate nodes perform their assigned processing jobs and return their respective output to the master node. The master node then processes the different output to provide a result for the original processing task. This is the reducing part of Map Reduce, where the master node reduces the output from multiple subordinate nodes into a result. Map Reduce is often used by search engines to parse through large amounts of data and return search results to a user quickly and efficiently. One example of a Map Reduce system is the Hadoop™ framework from Apache Software Foundation, also called the Hadoop™ Distributed File System (HDFS).

The HDFS framework relies on data replication to provide increased reliability. For example, if one data node fails to operate, the data can be accessed from another data node. The master node commands that multiple copies of the data be made, and the data nodes comply by performing a server-to-server replication.

In one example server-to-server replication process, a data node that has a copy of the data sends the data over a network (e.g., a layer 2 connection, such as Ethernet) to another node that saves the data in its own local storage. However, the amount of data to be copied can be quite large, which consumes network bandwidth. Additionally, conventional Von Neumann processor architecture passes the data through the processor so that large data transfers in systems with such processors can consume large amounts of computer processing cycles, computer bus bandwidth and computer memory as well. Thus, keeping additional copies of data may increase reliability, but it also has a cost in bandwidth and processing power. Conventional distributed processing systems often incur too much cost in providing data replication.

BRIEF DESCRIPTION OF THE DRAWINGS

The present disclosure is best understood from the following detailed description when read with the accompanying figures.

SUMMARY

Figure 1:
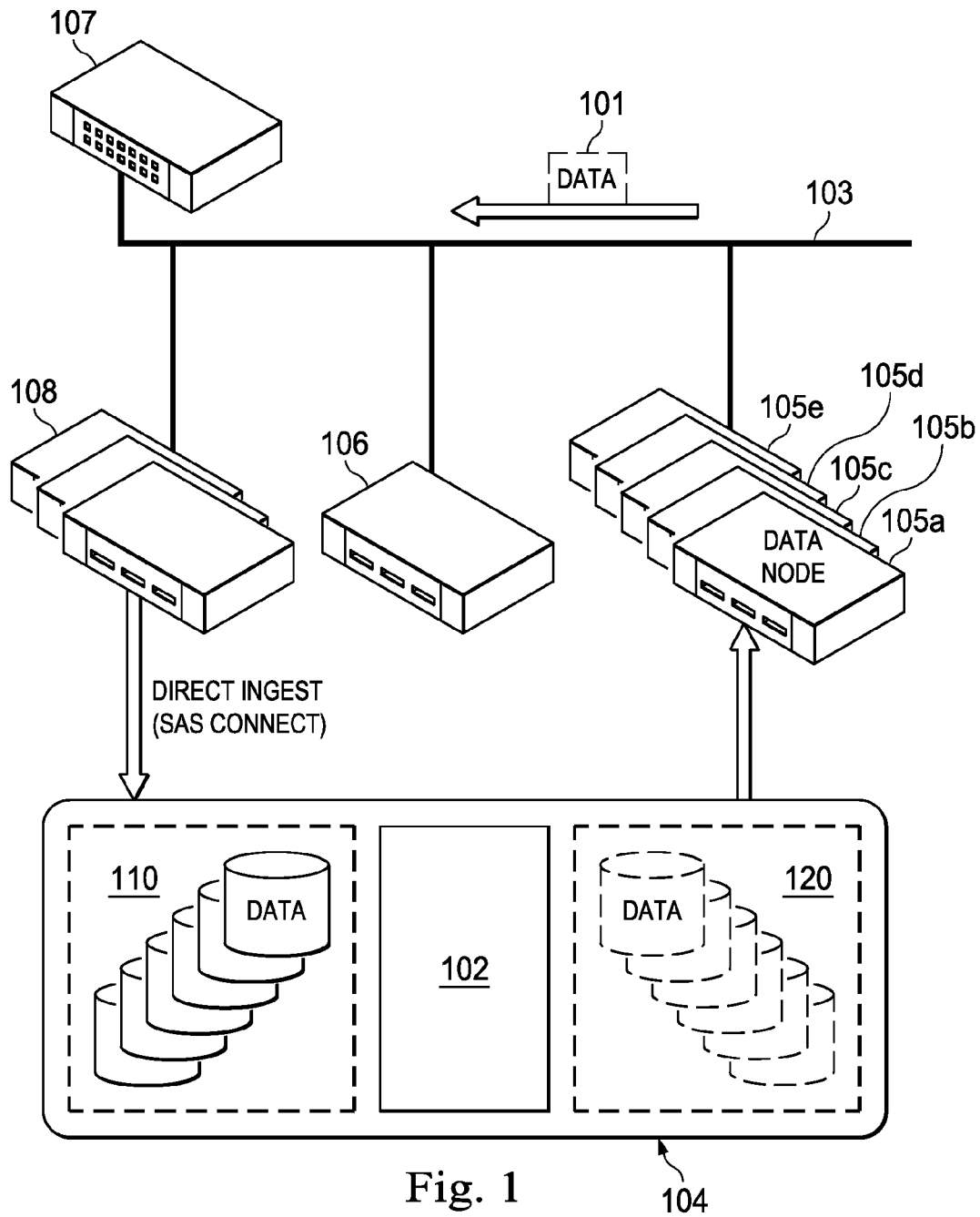
FIG. 1 is an illustration of an example system in which various embodiments may be implemented.

Various embodiments include systems, methods, and computer program products that provide data replication to a distributed analytics system using snapshots. In one example, a distributed analytic computing system receives data and sends that data to a storage array. The storage array then creates multiple snapshots of the data, where each of the snapshots corresponds to a data node in the distributed analytic computing system. Each data node accesses its own, separate snapshot as a virtual volume as it performs analytical tasks on the data.

One of the broader forms of the present disclosure involves a computer program product having a computer readable medium tangibly recording computer program logic for performing analytics on data at a data node, the computer program product including code to instruct a storage array to create a snapshot of the data, code to access the snapshot, by the data node, as an independent virtual volume, code to receive, at the data node, a command mapping a processing task to the data node, in which the processing task includes analysis on the data, and code to perform the processing task on the data by accessing the data through the snapshot.

Another of the broader forms of the present disclosure involves a method performed in a distributed computer system with a master node and a plurality of data nodes, the method including receiving data into the distributed computer system and saving the data to a storage array in communication with the distributed computer system, sending commands to the storage array causing the storage array to create a plurality of virtual replicas of the data, and accessing the data by the plurality of data nodes, where each one of the plurality of data nodes mounts a respective one of the virtual replicas as an independent copy of the data.

Another of the broader forms of the present disclosure involves a distributed computing system including a master node, a plurality of data nodes that carry out instructions from the master node, a storage array in communication with the master node and the data nodes, where the storage array is configured to receive data from the master node and to create virtual replicas of the data for access by the data nodes as independent virtual volumes, and in which the master node includes a scheduling function to map processing tasks to each of the data nodes, the processing tasks including analysis of the data accessed through the virtual replicas.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments disclosed herein provide for using snapshots as independent virtual volumes at the data nodes of a distributed analytic computing system. In one example, a method includes ingesting the data at the master node and then sending the data to a storage array. The data at the storage array is saved in at least one master copy and, at the command of the master node and data nodes, is virtualized to provide multiple snapshots of the data. In this example embodiment, each of the snapshots acts as an interface to the underlying data and can be mounted by a data node as a volume with its own Logical Unit Number (LUN). From the point of view of a data node, its snapshot appears as an independent copy of the data. Thus, data replication at the data nodes can be provided by snapshots, incurring less cost than creating actual physical copies. One example embodiment includes adapting an HDFS implementation to use an external storage array and snapshots to provide data replication.

The method may further include mapping processing tasks to the various data nodes of the system. Each of the data nodes performs its mapped processing task on its portion of the data, but rather than accessing an independent copy of the data, each data node accesses its respective snapshot. The method may further include the data nodes sending results of the processing tasks back to the master node. The master node may then process the results and compute output.

The scope of embodiments is not limited to any particular framework. Various embodiments may find use with Hadoop™ analytics or any other multi-server open source analytics such as NO-SQL™, Cassandra™, Lexis/Nexis™, and the like. Furthermore, some embodiments may find use with any other multi-client clustered file system such as Lustre™ Glustre™, StorNext™, StorageGrid™, or HDFS used without HBase or Hadoop™. In fact, the embodiments described above may be applied to scale-out analytics problems involving dozens or hundreds of servers working on a large, single dataset.

FIG. 1 is an illustration of an example system 100 in which various embodiments may be implemented. The distributed analytic computing system includes master node 106 and data nodes 105*a-e*. In this example, the master node 106 and the data nodes 105*a-e* are configured to act as a Map Reduce system, as described in more detail above. However, the scope of embodiments is not limited to Map Reduce systems or to HDFS implementations, as any appropriate distributed computing system with data replication may be adapted for use in example system 100.

Each of the data nodes 105*a-e* may include, for example, a personal computer (PC), server computer, a workstation, handheld computing/communication device or tablet, and/or the like. The same is true for master node 106 as well, though in many embodiments each of master node 106 and data nodes 105*a-e* includes a server computer, such as a commodity server with many processors running the Linux operating system. FIG. 1 shows five data nodes 105*a-e*, but the scope of embodiments can include any appropriate number of data nodes.

Furthermore, the amount of replication in this example system is five (one replication per data node), though the scope of embodiments may include any appropriate degree of replication. As described further below, various embodiments may facilitate scaling with a high level of efficiency, so that embodiments with any practical number of data nodes 105 and degree of replication may be accommodated.

Master node 106, data nodes 105*a-e*, and storage controller 102 are in communication over network 103 using switch 107. The network 103 may include, for example, a local area network (LAN), wide area network (WAN), the Internet, or any combination of such interconnects. Storage array 104 is coupled to ingest servers 108 through a Serial Attached SCSI (SAS) physical connection and protocol; or similar physical connection and protocol, though the scope of embodiments may include any appropriate interface to storage array 104. Ingest servers 108 provide appropriate pre-processing to received data and pass the received data to storage array 104.

The storage controller 102 manages the storage of data 101 in storage array 104 so that master node 106 and data nodes 105*a-e* do not see the specific inner workings of storage array 104. Storage controller 102 instead provides an interface to storage array 104 which, from the perspective of master node 106 and data nodes 105*a-e*, appears as a set of logical storage objects referred to as virtual volumes that may be mounted (e.g., accessed by a data node for the storage and retrieval of data in the virtual volume). Storage controller 102 can be inside or outside of the enclosure that includes storage array 104.

Storage array 104 is not limited to any particular storage technology and can use any storage technology now known or later developed. For example, storage array 104 has a number of nonvolatile mass storage devices (not shown), which may include conventional magnetic or optical disks or tape drives; non-volatile solid-state memory, such as flash memory; or any combination thereof. In one particular example, storage array 104 may include one or more Redundant Arrays of Independent Disks (RAID)s.

Storage array 104 may be configured to allow data access according to any appropriate protocol or storage environment configuration. In one example, master node 106 and data nodes 105*a-e* utilize file-level data access services, as is conventionally performed in a NAS environment. In another example, master node 106 and data nodes 105*a-e* utilize block-level data access services, as is conventionally performed in a SAN environment. In yet another example, master node 106 and data nodes 105*a-e* utilize both file-level and block-level data access services.

Storage array 104 stores master copy 110, which serves as a base volume that is updated as write operations change the data or add to the data. Data 101 is received by the system 100 at ingest servers 108 and passed to storage controller 102. Storage controller 102 then saves data 101 to master copy 110.

In some examples, master copy 110 is a single master copy, though the various embodiments do not preclude physical replication altogether. Rather, storage array 104 may provide some form of physical data replication for purposes of reliability or failure prevention. However, in contrast to some conventional systems, such as HDFS, the embodiment of FIG. 1 does not perform a server-to-server copy function.

Storage array 104 also includes snapshots 120, which are virtual replicas of the data in master copy 110. Depending on the application, snapshots 120 may collectively be substantially complete with respect to the master copy, and in other examples snapshots 120 may only provide access to portions of the data in master copy 110. In the example of FIG. 1, data nodes 105*a-e* request storage array 104 to make some or all of the data in master copy 110 available as snapshots 120. For instance, if the analytic tasks only analyze portions of the data stored to storage array 104, then the snapshots 120 may provide an interface only for those portions.

As mentioned above, snapshots 120 act as interfaces to the data in master copy 110. However, it should be noted that as the data in master copy 110 is updated, the data in any given snapshot will not be updated, and thus a snapshot may in some instances not provide an interface to the latest version of the data. Nevertheless, snapshots 120 may provide an acceptable alternative to accessing physical replications in many embodiments.

Various embodiments include new techniques using snapshots to replace server-based replication. The scope of embodiments may include any appropriate technique for creating snapshots 120. In general, a given snapshot volume represents a point-in-time image of another volume on a storage system. In this example, snapshots 120 are implemented as "virtual" copies of the volume they are duplicating (in this case, snapshots 120 are duplicating master copy 110). Thus, snapshots 120 and master copy 110 are exportable by storage array 104 as separate logical units (commonly referred to as LUNs).

The following example provides one way of creating snapshots, though the scope of embodiments is not limited to any snapshot-creating technique. Internally, each of the individual snapshots is implemented as a redirection table (not shown) and a small repository volume (not shown) for storing the original contents of data blocks that are subsequently on the base (original) volume—in this case, master copy 110. The redirection table has an entry for each block in the master copy 110. The redirection table is initially empty, but it is updated for each write to the master copy 110. When a write to the master copy 110 occurs, the storage controller 102 will first copy the original contents of the block being written to the repository. Following the "copy on write" operation, the redirection table is updated to indicate that these blocks are now updated and should be retrieved from the repository volume instead of the master copy 110. Storage controller 102 updates the master copy 110 by the write (following the steps above) and treats the master copy 110 normally for reading data. A similar mechanism is used to support writes to a snapshot volume, although snapshots 120 are sometimes implemented and/or used as read-only volumes. Hence, the write case with respect to snapshots 120 does not apply to some embodiments.

The above description is a simplification of the "copy on write" approach for implementing snapshot volumes, and it is provided for ease of explanation. Some implementations of the embodiment of FIG. 1 include optimizations that limit overhead and increase performance when performing copy on write, though such optimizations are beyond the scope of this example.

As described above, the embodiment of FIG. 1 provides an inexpensive creation of a separate LUN that contains the same data (or nearly the same) as the base volume. Standard file systems on Linux, such as though used by HDFS, are not designed to be shared. Hence, the conventional approach to sharing data is to copy the data into separate file systems, one per host participating in the sharing. By contrast, in the present embodiment, once a given snapshot 120 is created on storage array 140, the master copy 110 remains mounted by one host (e.g., master node 106 or any one of data nodes 105a-e), and one of the snapshots 120 can be mounted as a separate, non-shared, copy by one of nodes 105a-e without incurring the overhead of copying the data. Additional, respective nodes 105 mount other instances of the snapshots 120. In other words, in this example embodiment, each respective node 105a-e accesses a snapshot 120 that has its own redirection table and repository volume. Each respective instance of the snapshots 120 is provided with a LUN in the same manner that any virtual volume of the storage array 140 would be provided a LUN. Providing each of the snapshots 120 with a separate LUN allows each of the snapshots to be accessed separately. Thus, in this example, each of the nodes 105a-e accesses a separate snapshot with its own unique LUN in the same way that a node 105a-e would access any other virtual volume. The creation and management of the snapshots 120 is performed by storage controller 102.

In system 100, data nodes 105a-e inform (via a checkin operation) the master node 106 of the blocks contained in its volume. Master node 106 tracks the set of files contained in the cluster file system, but it relies on each of the data nodes 105a-e to disclose where the data blocks for each file are stored. (A cluster file system in this example is a file system that allows multiple different computers to share a common data volume). When a snapshot volume is mounted as a separate LUN on a second one of the data nodes 105a-e, the data node owning the base volume (master copy 110) and the data node owning the snapshot volume both disclose to the master node 106 the same block IDs for the blocks stored on the master copy 110. Thus, it appears to master node 106 that each of the data nodes 105a-e has its own local copy of the data (i.e., virtual locality exists in system 100 for each of the data nodes 105a-e).

System 100 is shown as an example only. Other types of hardware and software configurations may be adapted for use according to the features described herein.

Figure 2:
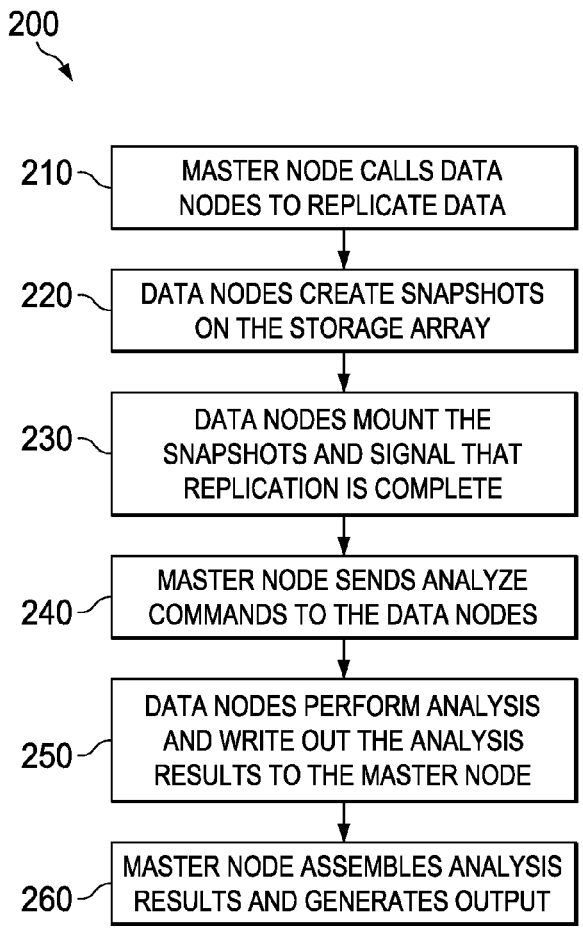
FIG. 2 is an illustration of an example distributed analysis process adapted according to one embodiment.

FIG. 2 is an illustration of an example distributed analysis process 200 adapted according to one embodiment. The process of FIG. 2 may be performed by, e.g., system 100 of FIG. 1 to perform a task partition operation. More specifically, example process 200 includes actions performed by data nodes 105a-e and master node 106 of FIG. 1. FIG. 2 assumes that the data has already been ingested into the storage array before block 210.

At block 210, the master node calls the data nodes to replicate data. This is similar to actions in a conventional HDFS implementation, where the master node instructs the data nodes to replicate the data. Thus, in some embodiments, functionality from conventional HDFS may be adapted for use, at least as far as the call from the master node the data nodes described in block 210. In some examples, the master node is not limited to a single node; instead, the functions of a master node may be implemented by two or more nodes. For instance, in an embodiment that builds upon an HDFS implementation, the master node may include both a name node and a job tracker node.

At block 220, the data nodes create snapshots on the storage array. In one example, each of the data nodes includes an Application Programming Interface (API) that communicates with a controller of the storage array to cause the storage array to make one or more snapshots. The storage array may use any appropriate technique to create the snapshots, including the copy on write operation described above.

Further in this example, the storage array may create writeable snapshots. In one example, the writable snapshots use the copy on write technique to update the master copy as the data is changed. Not every embodiment may implement snapshot write functionality in the data nodes. But those embodiments that do implement write functionality may apply the updates to one or more base volumes of the data on the storage array.

At block 230, the data nodes mount the snapshots. In one example implementation the data nodes have an API that receives a signal from the storage array that the snapshots are created. After receiving the signal a particular data node mounts its respective snapshot volume. In this example, the storage array configures its disk drives into RAID-groups and volumes with addresses and access privileges on the storage-area-network. The storage array mounts or allows access by one or more servers to one or more volumes using the storage-area-network address and access privileges.

As mentioned above, the storage array is configured to present the snapshots as virtual volumes with their own separate LUNs. In block 230, the data nodes mount the snapshots as they would any other virtual volumes provided by the storage array. Each of the snapshots has its own LUN, and each of the data nodes mounts its own respective snapshot volume. After the data nodes have mounted the snapshot volumes, the data nodes interact with the snapshot volumes, from the point of view of the data nodes, as they would with any other volumes.

Block 230 may further include the data nodes signaling to the master node that the data replication is complete. This step may be the same as, or similar to, a signaling step in HDFS in which the data nodes signal that data replication is complete.

At block 240, the master node sends "analyze" commands to the data nodes. In a system adapted from an HDFS implementation, the master node may use a job scheduler function to map different analytic jobs to the different nodes, according to task partitioning principles. Block 240 may be performed in response to receiving a signal from the data nodes that the replication is complete At block 250, the data nodes perform the commanded analytics and send the results back to the master node. In some examples each of the data nodes performs a different analytic job (processing subtask) on the same underlying data, and in other examples each of the data nodes performs a similar analytic job on different portions of the underlying data. The scope of embodiments is not limited to any particular analytic job or any particular way of mapping the analytic jobs to each of the data nodes. In an embodiment adapted from a HDFS implementation, block 250 may also include each of the data nodes sending signals to the master node to indicate that their respective analytic job is done.

At block 260, the master node assembles the analysis results and generates output. The action of block 260 may be performed according to task partitioning principles in which the results are reduced to create acceptable output to a human user or another application.

FIG. 2 is exemplary, and the scope of embodiments is not limited to the specific series of steps shown. Other embodiments may add, omit, rearrange, or modify one or more actions. For instance, some embodiments may follow block 260 with sending a "cleanup" command to the data nodes, which delete some or all of the snapshots. The master copy may then remain as the managed and updated data.

Some embodiments include repeating process 200 multiple times. Thus, in one example, the distributed analytic system receives multiple processing requests from different users (e.g., in a web search engine embodiment) for processing the same data. In such an example, the analysis steps may be performed multiple times for a given replication operation. However, the data may be changed or replaced as often as appropriate, and in some embodiments, the replication operations may be performed as often or nearly as often as the data is changed or replaced. In some embodiments, the data replication operation may be performed for each subsequent processing task received by the distributed analytic computing system.

Figure 3:
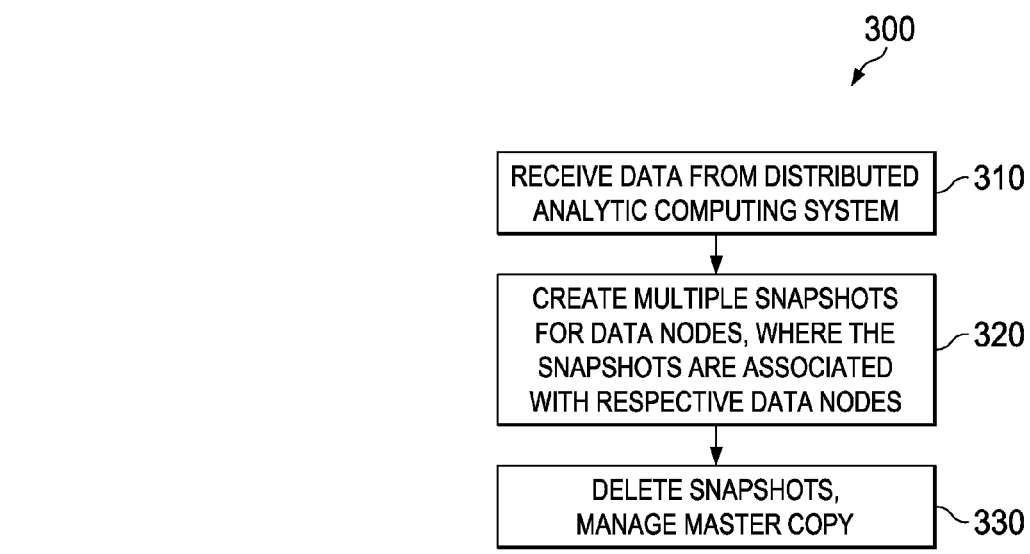
FIG. 3 is an illustration of an example process for providing snapshots to a distributed analytic computing system.

FIG. 3 is an illustration of an example process 300 for providing snapshots to a distributed analytic computing system. Process 300 may be performed, e.g., by the storage array 104 and storage controller 102 of FIG. 1 when interacting with the data nodes 105*a-e* and master node 106.

At block 310, the storage array receives data from the distributed analytic computing system. The data is ingested at the distributed analytic computing system, which may or may not include pre-processing of the data. In any event, the storage controller causes the storage array to store the data as managed data, for example, as a master copy. The storage array stores the managed data according to any appropriate technique. For instance, the storage array may distribute the managed data in one or more virtual volumes.

At block 320, the storage array creates multiple snapshots for the data nodes. In one example, the storage controller receives signals from APIs at the data nodes requesting that the storage array create one or more snapshots of the data. The snapshots may be read-only or writable and may be created by any appropriate technique. As explained above, in a RAID example, the copy on write technique may be used to create one or more snapshots and to update the base volume when data is changed.

Further as explained above, the snapshots are not complete, physical copies of the underlying data. In some embodiments, each snapshot may include a redirection table and a repository for storing data to be updated. In an embodiment with multiple snapshots of the same data, each snapshot functions as an interface by pointing to the same underlying data, so that each snapshot is not a separate copy.

In the example above, each data node is associated with at least one snapshot. Each such snapshot appears as a mountable virtual volume by virtue of having its own LUN. Block 320 may also include, in some embodiments, sending a signal from the storage array or storage controller to the data node to indicate when the snapshot creation is complete.

At block 330, the storage array deletes the snapshots and manages the master copy of the data. Deleting the snapshots may be performed in response to a command from the master node after the analytic tasks are complete. Managing the master copy may include updating the data in the master copy to reflect any recent write operations, whether the write operations were performed by a data node on a writable snapshot or performed directly on the master copy.

Just as with process 200 of FIG. 2, processes 300 of FIG. 3 is exemplary, and the scope of embodiments is not limited to the specific configuration shown. Other embodiments may add, omit, rearrange, or modify one or more actions. For instance, process 300 may be performed in conjunction with process 200 so that blocks 310, 320, 330 are performed as often as commanded by the distributed analytic computing system.

The embodiments described above may provide one or more advantages over conventional HDFS implementations. For instance, whereas conventional HDFS implementations use actual, physical replication to achieve the desired degree of data replication, the embodiments described above use snapshots provided by an external storage array. Each snapshot is not a complete replication of the underlying data and, therefore, does not have the same cost in storage space. Furthermore, elimination of server-to-server replication in favor of replication within an external storage array conserves bandwidth of the network and processing power at the nodes.

Figure 4:
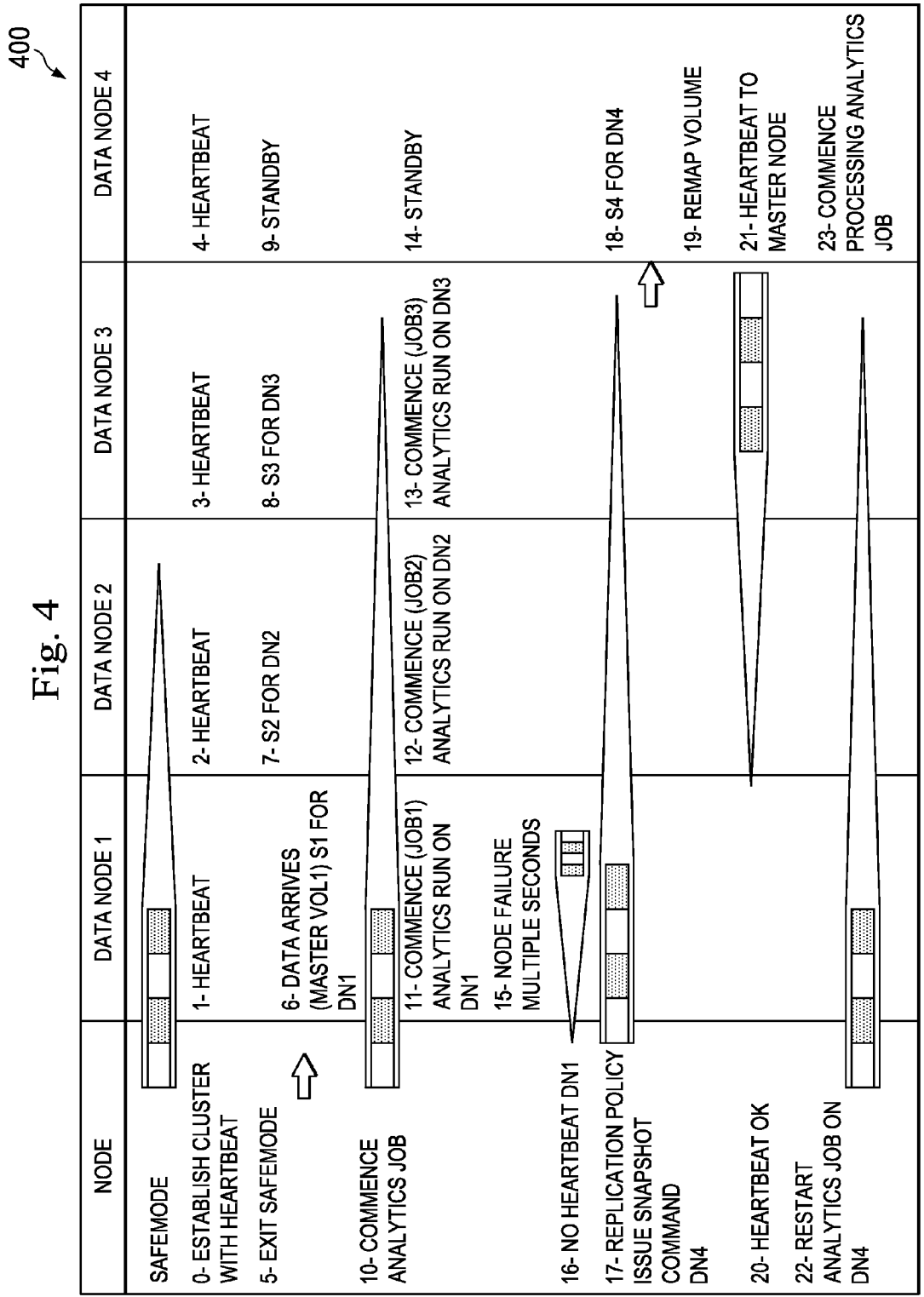
FIG. 4 is a timeline that illustrates a failure recovery process according to one embodiment, which takes advantage of reduced replication time in the system of FIG. 1.

An additional advantage of snapshots in the context of FIG. 1 is that a given snapshot may be generated and mounted in a matter of seconds. This is in contrast to a conventional HDFS implementation that may have multiple terabytes of data in a particular replication at a data node. Copying terabytes of data may, with current technology, take multiple hours to complete. Therefore, replication during normal use, as well as replication during failure recovery, may benefit from the embodiments described herein by virtue of increased efficiency and lower down times. FIG. 4 is a timeline that illustrates a failure recovery process 400 according to one embodiment, which takes advantage of reduced replication time in the system of FIG. 1. Specifically, the timeline illustrates actions taken by the data nodes 105*a-e* and the master node 106 of FIG. 1. FIG. 4 illustrates actions by only four data nodes, and it is understood that the actions of FIG. 4 can be applied to any appropriate number of data nodes.

Process 400 begins at action 0 in a safe mode, where the master node establishes a cluster by initializing four data nodes. Each of the data nodes are represented by a column in the signal diagram. For abbreviation "DN" refers to a data node, and "S" refers to a snapshot.

At actions 1-4, each of the data nodes generates a heartbeat signal to indicate to the master node that the data node is responsive and operable. Although not shown explicitly in FIG. 4, each of the data nodes periodically generates a heartbeat signal so that its respective status can be continually monitored by the master node.

After the cluster is established and operability of the data nodes is confirmed, the distributed analytic computing system exits safe mode at action 5. At action 6, data arrives at the distributed analytic computing system, and the data is sent to the storage array to be stored as a master copy.

The master node sends a command to the data nodes directing the data nodes to perform replication. Such action is described in more detail above with respect to block 210 of FIG. 2. At actions 6-8, the data nodes comply with the master node's commands by sending commands to the storage array to create snapshot volumes. The storage array creates the snapshot volumes, which are mapped to the specific data nodes. The data nodes then mount their respective snapshot volumes. These actions are described above in more detail with respect to blocks 220, 230 of FIG. 2 and block 320 of FIG. 3. Data node 4 is not in use at this part of the timeline yet and is indicated as "standby" at actions 9 and 14.

At action 10, the master node commences an analytics job by mapping processing subtasks to the data nodes. The master node sends analyze commands to the data nodes, as in block 240 of FIG. 2.

At actions 11-13, the data nodes run their respective processing subtasks, as in block 250 of FIG. 2. During this time, each of the data nodes is continuing to generate heartbeat signals. However, at action 15, data node 1 ceases to generate heartbeat signals and is assumed to be inoperative.

In response to the lack of a heartbeat signal from data node 1, the master node takes data node 1 off line and issues a command to data node 4 to mount the snapshot volume currently mapped to data node 1. Data node 4 mounts the snapshot volume at actions 18 and 19 so that the volume used by data node 1 is remapped to data node 4. Alternatively, action 18 may include creating a new snapshot volume for data node 4 rather than mounting the snapshot volume used by data node 1. During this time, processing continues at data nodes 2 and 3, and the processing subtasks assigned to data node 1 are rescheduled by the master node to data node 4.

It is worth noting that the actions 18 and 19 of FIG. 4 may take only a few seconds (or even less than a second in some applications). Thus data node 4 replaces data node 1 with very little downtime. This is in contrast to a conventional HDFS implementation, which continues to process the task with fewer nodes (two instead of three) while it initiates a physical replication of the data from one of the working servers over the network to data node 4, causing I/O congestion in the network and at the servers and wasting processing power at the servers. Furthermore, a physical, server-to-server replication in a conventional DHFS implementation may take hours or days, depending on the particular implementation. Therefore, the various embodiments described above that use snapshot volumes provide significant advantages in reducing downtime.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors (not shown) running in one or more of master node 106 and/or data nodes 105a-e (FIG. 1) execute code to implement the actions shown in FIGS. 2 and 4. Also, in some embodiments, one or more processors (not shown) running in one or more of storage controller 102 (FIG. 1) execute code to implement the actions shown in FIG. 3.

Various embodiments may include one or more advantages over conventional systems. Specifically, advantages regarding time savings, lower storage costs, less network congestion, and less processing power waste are explained above. In addition to those advantages, various embodiments described herein may provide increased scalability compared to conventional DHFS implementations that use server-to-server, physical replication. As explained above, there is very little cost for creating snapshots in terms of time, storage space, and the like. Various embodiments may take advantage of this low cost by providing any arbitrary degree of replication desired for a particular application. In other words, the storage array can be configured to provide almost any degree of replication because of the low cost of snapshot volumes. Thus, while the typical degree of replication for a conventional DHFS implementation is three, various embodiments described herein may provide replication at significantly higher degrees.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer program product having a non-transitory computer readable storage medium tangibly recording computer program logic for performing analytics on data at a data node, the computer program product comprising:
    code to instruct a storage array to create a snapshot of the data;
    code to instruct the data node to mount the snapshot as an independent virtual volume;
    code to receive, at the data node, a command mapping a processing task to the data node, in which the processing task includes analysis on the data; and
    code to perform the processing task on the data by accessing the data through the snapshot, wherein the code to perform the processing task includes:
        code to instruct the data node to perform the analysis on the data by accessing the data via the independent virtual volume; and
        code to instruct the data node to report a result of the analysis to a master node.

2. The computer program product of claim 1 in which the code to instruct the storage array comprises an Application Programming Interface (API).

3. The computer program product of claim 1 wherein the command mapping the processing task is received from the master node.

4. The computer program product of claim 1 further comprising:
code to write to the data via the snapshot.

5. The computer program product of claim 1 further comprising:
code to command the storage array to delete the snapshot after the processing task is performed.

6. The computer program product of claim 1 in which the snapshot is mounted as a volume with a Logical Unit Number (LUN).

7. The computer program product of claim 1 in which the snapshot includes a redirection table and a repository volume configured to store contents of modified data blocks.

8. A method performed in a distributed computer system with a master node and a plurality of data nodes, the method comprising:
receiving data into the distributed computer system and saving the data to a storage array in communication with the distributed computer system;
sending commands to the storage array causing the storage array to create a plurality of virtual replicas of the data;
accessing the data by the plurality of data nodes, where each one of the plurality of data nodes mounts a respective one of the virtual replicas as an independent copy of the data;
analyzing portions of the data via respective ones of the virtual replicas at each of the data nodes; and
reporting results of the analysis by each of the data nodes to the master node.

9. The method of claim 8 further comprising:
receiving a processing task at the distributed computer system;
dividing the processing task into sub-tasks and assigning ones of the sub-tasks to respective data nodes.

10. The method of claim 8 in which the storage array comprises a Redundant Array of Independent Disks (RAID).

11. A method performed in a distributed computer system with a master node and a plurality of data nodes, the method comprising:
receiving data into the distributed computer system and saving the data to a storage array in communication with the distributed computer system;
sending commands to the storage array causing the storage array to create a plurality of virtual replicas of the data;
accessing the data by the plurality of data nodes, where each one of the plurality of data nodes mounts a respective one of the virtual replicas as an independent copy of the data detecting that one of the data nodes is failing;
mounting one of the virtual replicas of the data to an additional data node; and
rescheduling an analytical task from the one of the data nodes that is failing to the additional data node after mounting the one of the virtual replicas.

12. The method of claim 8 further comprising:
saving the data to a single master copy at the storage array before creating the plurality of virtual replicas.

13. The method of claim 8 in which the distributed computer system comprises a Map Reduce system.

14. The method of claim 8 in which each of the virtual replicas comprises a redirection table pointing to a same copy of the data.

15. A distributed computing system comprising:
a master node;
a plurality of data nodes that carry out instructions from the master node; and
a storage array in communication with the master node and the data nodes, where the storage array is configured to receive data from the master node and to create virtual replicas of the data,
in which the master node includes a scheduling function to map processing tasks to each of the data nodes, the processing tasks including analysis of the data accessed through the virtual replicas, and
in which the data nodes are operable to:
mount at least one of the virtual replicas as an independent virtual volume;
analyze a portion of the data by accessing the data via the independent virtual volume in response to the mapped processing tasks; and
report a result of the analysis to the master node.

16. The distributed computing system of claim 15 in which the master node and the data nodes each comprise a server computer.

17. The distributed computing system of claim 15 in which the storage array is configured to create an arbitrary number of virtual replicas without physically copying the data blocks from one data node to another of the data nodes.

18. The distributed computing system of claim 15 in which the storage array is external to the master node and the plurality of data nodes.

19. The distributed computing system of claim 15 in which each of the virtual replicas comprises a redirection table pointing to a same copy of the data.

20. The distributed computing system of claim 15 further comprising:
ingest servers performing pre-processing on the data before saving the data to the storage array.

* * * * *